Nov. 13, 1934.　　　A. D. ROBINSON　　　1,980,878

CONTAINER FOR DISPENSING FLUID SUBSTANCES

Filed March 18, 1933

INVENTOR.
Archie D. Robinson
BY Walter C. Ross
ATTORNEY.

Patented Nov. 13, 1934

1,980,878

UNITED STATES PATENT OFFICE 1,980,878

CONTAINER FOR DISPENSING FLUID SUBSTANCES

Archie D. Robinson, Westfield, Mass.

Application March 18, 1933, Serial No. 661,498

1 Claim. (Cl. 120—71)

This application relates to improvements in containers for dispensing fluid substances and is directed more particularly to apparatus for dispensing ink and other like fluids.

The principal objects of the invention are directed to the provision of a novel receptacle for a fluid substance such as writing ink and the like and according to one special feature of the invention there is provided a receptacle for a fluid having means associated therewith for receiving an implement such as a pen holder, the said means being adjustable relative to the receptacle so that a certain part of the implement such as the point of a pen may be moved accordingly as the level of fluid in the receptacle varies.

The invention in its broad application is adapted for various uses. That is to say, it may be used for mucilage, paste and other substances where it is desired to support an appropriate implement in such a manner that accordingly as the fluid in the receptacle is depleted the brush or other implement is positioned so that the implement is in contact with the fluid at all times. This is both for the protection of the implement, and to safeguard against corrosion. The way in which the pen holder or other implement is supported tends to prevent evaporation of the fluid. It is also possible by means of the invention to dip the implement readily and quickly as it is being used.

The invention will be disclosed for purposes of description in connection with its application to an ink-well or fountain, but it is not desired to be limited to the exact form of the invention shown and described. The preferred form of the invention is illustrated in the accompanying drawing, wherein.

Figure 1:
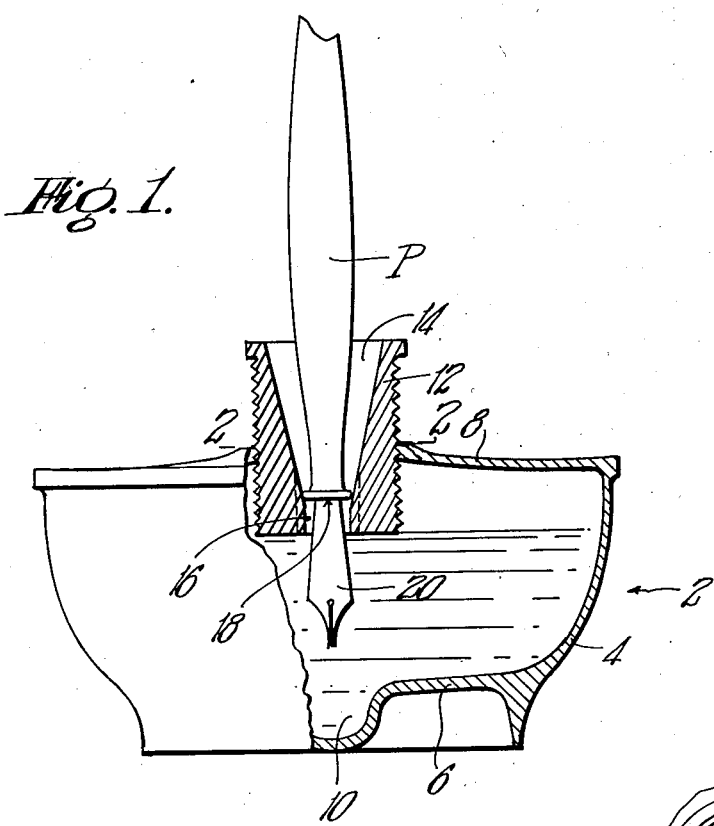
Fig. 1 is a combined elevational and sectional view of a receptacle and socket embodying the novel features of the invention.

Referring now to the drawing more in detail the invention will be fully described.

In Fig. 1 there is shown a receptacle indicated generally by 2. This may be called an ink fountain and may have side walls 4, a bottom wall 6 and an upper wall 8. The upper wall 8 may be integral with the side wall of the receptacle or it may be a separate part such as a closure adapted to be detachably secured to the receptacle in some convenient way such as by screw threads or the like. The receptacle may take various forms and shapes depending upon the fluid which it is desired to use, the form shown being merely for illustrative purposes.

According to one feature of the invention the lower wall 6 inclines inwardly towards the center of the receptacle and is provided with a sump 10 of some suitable form in the central portion thereof, as shown.

A socket member 12 is provided which has a central opening 14, the side walls of which are preferably inclined as shown. The opening terminates into a more or less restricted opening 16 at the lower side of the socket. These openings not only serve as a guide for an implement such as a pen holder, but serve to support the implement, P, in a desired position.

According to one feature of the invention, the socket 12 is preferably movable relative to the receptacle. This may be accomplished in various ways such as by sliding the socket relative to the upper part of the receptacle, as in the upper wall or cover thereof. In the form of the invention shown however, the socket 12 is screw threaded in the upper wall 8 so that by rotating the socket in one way or the other the socket is moved up or down relative to the receptacle. Of course, the socket may be likewise threaded in a cover or closure for the receptacle.

The socket has the tapering central opening to provide a tapering guideway so that a pen holder P for instance may be readily and easily inserted therein. In inserting the pen holder in the socket it may be tilted at various angles and when released the pen will assume a more or less vertical position as shown.

Preferably the pen holder P has a shoulder or ledge 18 on its lower end which rests in the tapering opening 14 whereby the pen point 20 projects downwardly through the opening 16 and into the ink or other fluid in the receptacle. It is desirable that the socket be adjusted so that the lowermost end thereof is approximately on the level of the fluid in the receptacle. This is so that when the pen holder is removed from the socket a small area of ink will be exposed through the socket and by thus restricting the area of ink which is exposed, evaporation of the ink is reduced to a minimum. Furthermore, when the pen holder is in the socket, the pen point is submerged in the ink so that the point is not exposed to atmospheric conditions. This tends to eliminate corrosion on the pen point and at the same time the opening through the socket is substantially closed by the end of the pen holder since the shoulder rests in the opening. The shoulder 18 may be formed on the pen holder by providing a flange such as shown, or by any well known means.

As the level of the ink lowers, the socket 12 may be adjusted relative to the upper wall 8 so that the lower end thereof follows the level of the link downwardly. In this way the pen point may be submerged at all times. When the supply of ink is substantially depleted, since the lower wall slants inwardly, the ink drains into the sump and the pen point will be submerged in the ink until the supply is practically exhausted.

By thus being able to lower the socket as the supply of ink is depleted it is always possible to not only submerge the pen point in the ink to prevent corrosion of the pen point but the evaporation of ink is quite substantially obviated. It will be appreciated also that it is possible for the user to use up practically all of the fluid in the receptacle since the pen point may be lowered in the sump.

As stated the pen holder P has a shoulder 18 which rests in the tapering central opening or guideway of the socket whereby the pen projects below the socket a definite distance. Since the pen, during its use, has its pen point more or less wet with ink which may also moisten the tapering opening of the socket, it is desired as a special feature of the invention to have the socket drain when the pen holder is inserted in the socket after using and thereby keep the shoulder 18 from becoming moistened with ink. To accomplish this, a lower portion of the tapering opening 14 and the opening 16 are provided with longitudinal spaced grooves 22 so as to form spaced points 24 therebetween. Thus the pen holder itself is kept dry and the fingers clean. The shoulder of the pen holder rests on the points 24 as distinguished from a continuous contact all around the pen holder and in that way ink on the socket easily drains through the grooves or notches back into the receptacle. This may not be necessary in some cases but provides a useful novel feature when desired.

Figure 2:
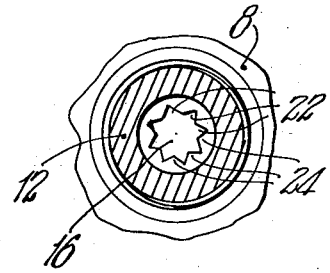
Fig. 2 is a plan sectional view on the line 2—2 of Fig. 1.
Figure 3:
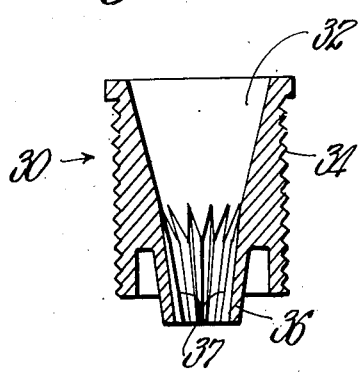
Fig. 3 is a sectional view through a socket showing certain novel features of the invention.

In the form of the invention shown in Fig. 3 a socket 30 has an upper tapering guideway 32 leading into a lower, more or less tapering guideway 37 of smaller size than the upper guideway. A hub 36 projects downwardly from the socket as shown and the interior of the guideway may be provided with the alternate notches and projections shown and as previously described in connection with Figs. 1 and 2. This socket may be movable relative to a receptacle as by screw threads 34 so that the pen holder is supported in correct position relative to the ink. This socket as in the former case is adapted to guide and suitably support a pen holder when not in use.

The various parts may be made of various materials as may be desired, depending on the fluid to be used. By changing the dimensions and shapes of the parts, the novel features of the invention will of course be adapted for a wide range of uses.

Having described the invention in the form at present preferred what it is desired to claim and secure by Letters Patent of the United States is:

The combination of a pen-holder having a shoulder of a certain diameter around its lower end and a pen-point extending therefrom which is of less diameter at its widest part than said shoulder with a container for writing fluid comprising, a receptacle having an upper wall provided with a central aperture therethrough and a socket member screw-threaded in said aperture including an upper main body portion of a certain outside diameter and a lower hub portion extending downwardly from said body portion having an outside diameter less than that of said body portion, said socket member being provided with a vertical bore therethrough having continuously converging sides to form a downwardly tapering guideway and a lower restricted opening at the lower side of said hub portion which is of less diameter than said shoulder of the pen-holder and slightly larger than that of said pen-point, all adapted and arranged whereby when said pen-holder is grasped in the hand and the pen-point inserted in said bore of the socket member at a substantial angle relative to the longitudinal axis thereof and released the pen-point passes through the said restricted opening and the pen-holder assumes a vertical position wherein it is supported by said shoulder thereof only which seats against the converging sides of the bore and is held against tilting and out of contact with the bore by the pen-point which may engage said restricted opening and has its lower end portion projecting below said hub portion and said socket member may be adjusted up and down to submerge the lower end portion of the hub and lower end portion of the pen-point in writing fluid in said container.

ARCHIE D. ROBINSON.